United States Patent
Plunkett et al.

(10) Patent No.: US 7,068,771 B2
(45) Date of Patent: *Jun. 27, 2006

(54) METHOD AND NETWORK FOR ROUTING A COMMUNICATION THROUGH AN ALTERNATE CARRIER

(75) Inventors: William Plunkett, Apex, NC (US);
Laura Culli, Austin, TX (US); M. Lourdes Coranado, Austin, TX (US);
David Hickman, St. Louis, MO (US);
Bruce A. Nance, St. Louis, MO (US);
John Simino, St. Louis, MO (US);
Mark Tamasi, St. Louis, MO (US)

(73) Assignee: SBC Laboratories, Inc., Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/747,447

(22) Filed: Dec. 30, 2003

(65) Prior Publication Data

US 2004/0151298 A1 Aug. 5, 2004

Related U.S. Application Data

(63) Continuation of application No. 10/330,198, filed on Dec. 30, 2002, now Pat. No. 6,697,480, which is a continuation of application No. 09/922,794, filed on Aug. 7, 2001, now Pat. No. 6,526,136, which is a continuation of application No. 09/592,731, filed on Jun. 13, 2000, now Pat. No. 6,292,552, which is a continuation of application No. 08/903,372, filed on Jul. 30, 1997, now Pat. No. 6,108,408.

(51) Int. Cl.
*H04M 3/42* (2006.01)
*H04M 7/00* (2006.01)
*H04M 15/00* (2006.01)

(52) U.S. Cl. ............... 379/221.02; 379/115.01; 379/211.03; 379/221.03; 379/221.06; 379/221.14

(58) Field of Classification Search ........... 379/114.01, 379/115.01, 201.01, 207.02, 211.02, 211.03, 379/212.01, 219, 220.01, 221.01, 221.02, 379/221.05, 221.06, 221.08, 221.14

See application file for complete search history.

(56) References Cited

U.S. PATENT DOCUMENTS

| | | | |
|---|---|---|---|
| 4,555,594 A | 11/1985 | Friedes et al. |
| 4,565,903 A | 1/1986 | Riley |
| 4,577,066 A | 3/1986 | Bimonte et al. |
| 4,791,665 A | 12/1988 | Bogart et al. |
| 4,866,763 A | 9/1989 | Cooper et al. |
| 5,311,585 A | 5/1994 | Armstrong et al. |
| 5,404,350 A | 4/1995 | DeVito et al. |
| 5,406,610 A | 4/1995 | Nishiki |

(Continued)

OTHER PUBLICATIONS

Berman et al., "Perspectives on the AIN Architecture," IEEE Communications Magazine, Feb. 1992, pp. 27-32.

*Primary Examiner*—Harry S. Hong
(74) *Attorney, Agent, or Firm*—Greenblum & Bernstein, P.L.C.

(57) ABSTRACT

A method and system for routing a communication through an alternate carrier. The A method includes recognizing an input number upon which a call is based, assigning primary, alternate and secondary interexchange carriers responsive to the recognizing, and sequentially routing an input number from a node among primary, alternate, and secondary carriers until a connection is established.

8 Claims, 6 Drawing Sheets

U.S. PATENT DOCUMENTS

| | | | |
|---|---|---|---|
| 5,406,620 A | 4/1995 | Pei | 379/221.02 |
| 5,473,681 A | 12/1995 | Partridge, III | |
| 5,475,749 A | 12/1995 | Akinpelu et al. | |
| 5,550,912 A | 8/1996 | Akinpelu et al. | |
| 5,553,129 A | 9/1996 | Partridge, III | |
| 5,583,926 A | 12/1996 | Venier et al. | |
| 5,661,792 A | 8/1997 | Akinpelu et al. | |
| 5,668,955 A | 9/1997 | DeCiutiis et al. | |
| 5,719,931 A | 2/1998 | Johnson | |
| 5,740,239 A | 4/1998 | Bhagat et al. | |
| 5,768,358 A | 6/1998 | Venier et al. | |
| 5,950,130 A | 9/1999 | Coursey | |
| 6,108,408 A | 8/2000 | Plunkett et al. | 379/221.01 |
| 6,292,552 B1 | 9/2001 | Plunkett et al. | 379/221.01 |
| 6,330,324 B1 | 12/2001 | Sabinson et al. | |
| 6,526,136 B1 | 2/2003 | Plunkett et al. | 379/221.02 |
| 6,697,480 B1 * | 2/2004 | Plunkett et al. | 379/221.02 |

* cited by examiner

METHOD AND NETWORK FOR ROUTING A COMMUNICATION THROUGH AN ALTERNATE CARRIER

This is a continuation of U.S. patent application Ser. No. 10/330,198, filed Dec. 30, 2002, issued as U.S. Pat. No. 6,697,480 B2; which is a continuation of U.S. patent application Ser. No. 09/922,794, filed Aug. 7, 2001, issued as U.S. Pat. No. 6,526,136; which is a continuation of U.S. patent application Ser. No.09/592,731, filed Jun. 13, 2000, issued as U.S. Pat. No. 6,292,552 on Sep. 18, 2001; which is a continuation of U.S. patent application Ser. No. 08/903,372, filed Jul. 30, 1997, issued as U.S. Pat. No. 6,108,408 on Aug. 22, 2000, all the contents of which are expressly incorporated by reference herein in their entireties.

BACKGROUND OF THE INVENTION

1. Field of the Invention

The present invention generally relates to the field of telecommunications and to an apparatus and method for managing telephony-based services, such as routing and translations services. More particularly, the present invention relates to an intelligent or advanced application, such as an Advanced Intelligent Network (AIN) application, for routing a special or dedicated identifier through multiple paths out of an AIN end office to a dedicated or special purpose telecommunications system, such as the Government Emergency Telecommunications Service (GETS).

2. Acronyms

The written description provided herein contains acronyms which refer to various communication services and system components. Although known, use of several of these acronyms is not strictly standardized in the art. For purposes of the written description herein, acronyms will be defined as follows:

10D—10 Digit Trigger
AIN—Advanced Intelligent Network
ACR—Alternate Carrier Routing
CCIS—Common Channel Interoffice Signaling
CCS—Common Channel Signaling
CO—Central Office
CIC—Carrier Identification Code
CPR—Call Processing Record
CPN—Calling Party Number
DID—Direct Inward Dialing
DLN—Dialed Line Number
DRS—Data and Reports System
EO—End Office
FIM—Feature Interaction Manager
ISCP—Integrated Service Control Point
ISUP—ISDN User Part
IXC—Interexchange Carrier
LATA—Local Access and Transport Area
MF—Multi-Frequency
NANP—North American Numbering Plan
NPA—Numbering Plan Area
NXX—Central Office Code
PIC—Primary Interexchange Carrier
PRI—Primary Rate Interface
PSTN—Public Switched Telephone Network
SCE—Service Creation Environment
SCP—Service Control Point
SMS—Service Management System
SRAS—Special Routing Access Service
SS7—Signaling System 7
SSP—Service Switching Point
STP—Signaling Transfer Point
TAT—Termination Attempt Trigger
TCAP—Transaction Capabilities Applications Part
TG—Trunk Group
TN—Telephone Number

3. Background Information (a) Government Emergency Telecommunications Service (GETS)

GETS is a telecommunications system maintained by GTE and the federal government for use during emergencies. Specifically, the Numbering Plan Area (NPA) code of 710 was established for the special federal government telephone number 710-NCS-GETS (i.e., 710-627-4387). In the prior art, this telephone number was routed to GETS either through the Primary Interexchange Carrier (PIC) of the calling location for offices with a GETS service, or through AT&T for a calling location that has contracted with AT&T for Special Routing Access Service (SRAS).

A drawback of the above arrangement is that only a single telephone carrier is available for connecting any one node/office to GETS. However, during an emergency, the particular carrier may not be available and/or accessible. For example, a flood of calls to a disaster area, downed communication lines, or damage to the carrier itself may cause service outage or overload.

(b) Advanced Intelligent Networks

In recent years, Advanced Intelligent Networks (AIN) have provided a number of new telephone service features. The AIN evolved out of a need to increase the capabilities of the telephone network architecture to meet the growing needs of telephone customers or users. The AIN architecture generally comprises two networks, a data messaging network and a trunked communications network. The trunked communications network handles voice and data communications between dispersed network locations, whereas the data messaging network is provided for controlling operations of the trunked communications network.

An illustration of the basic components of AIN architecture is shown in FIG. 1. As shown in FIG. 1, Service Switching Points (SSP's) 64–70 are provided for sending and receiving data messages from a Service Control Point (SCP) 56 via Signaling Transfer Points (STP's) 58–62. The data messages are communicated to and from the SSP's 64–70 and the SCP 56 along a Common Channel Signaling (CCS) network 88. Each SSP 64–70 routes telephone calls between a plurality of dispersed network stations 172–186. For example, SSP's 64–70 may route a telephone call between a calling station (e.g., station 172) and a called station (e.g., station 184) through trunks 90 and customer lines 92 (e.g., telephone lines). Stations 172–186 may comprise various customer or terminal equipment, such as a telephone unit (wired, cellular or mobile), a facsimile machine, and/or a modem attached to a personal computer.

More information regarding AIN may be found in various publications. See, for example, Berman, Roger K., and Brewster, John H., "Perspectives on the AIN Architecture," IEEE Communications Magazine, February 1992, pp. 27–32, the disclosure of which is expressly incorporated herein by reference in its entirety.

A number of services or features provided by prior AIN or AIN-type intelligent networks relate to specialized call processing or recording of incoming calls and call traffic. For example, U.S. Pat. No. 5,583,926 discloses routing of calls to dedicated numbers. The subscriber can select an overflow routing option to provide a list of overflow routes or trunks to provide alternate routes within a single network to connect a call. The alternate routes may be available to the Primary Interexchange Carrier if the most direct route is overloaded.

A drawback of the above-noted patent is that while it establishes several routes to place calls to a carrier, it cannot route the call to an alternate carrier if the carrier is disabled or otherwise inaccessible. Further, prior systems do not permit a user or party to dial a dedicated number to optionally select a specific carrier and/or backup carriers to ensure completion of the call.

SUMMARY OF THE PRESENT INVENTION

In view of the above, the present invention, through one or more of its various aspects and/or embodiments is thus presented to accomplish one or more objects and advantages, such as those noted below.

A general feature of the invention provides an improved routing scheme for GETS calls that will increase the probability that a GETS call will be successfully completed. Such a routing scheme may include an apparatus and method for automatic routing of GETS calls.

Another feature of the present invention provides an apparatus and method for sequentially routing a call to GETS to more than one Interexchange Carriers (IXC's) to ensure that an alternate or secondary alternate ("secondary") carrier can be used to complete the call if the node/office cannot connect to the primary carrier. The ability to switch to other carriers increases the probability that the emergency call will connect with an Interexchange Carrier to complete the call.

A further feature of the invention incorporates the above into an AIN environment, such that the SCP of the AIN performs a GETS Alternate Carrier Routing (GETS ACR) logic to assign primary, alternate, and secondary carriers.

It another feature of the invention to monitor and classify the GETS call for later retrieval for billing and/or statistical analysis.

Accordingly, one aspect of the present invention is to assign default primary, alternate, and secondary carriers to individual end offices of the AIN. These carriers are preferably selected from an interexchange carrier group of telecommunications carriers, such as AT&T, MCI, and Sprint. If the AIN end office cannot connect with the interexchange carrier of a designated primary carrier, then the call will be routed to the interexchange carrier of an alternate carrier. If the AIN end office fails to connect with the alternate carrier, then the system will route the call through the interexchange carrier of a secondary carrier.

According to another aspect of the present invention, a caller can manually select a primary carrier when placing a GETS call. If requested, the system will assign alternate and secondary carriers based on the highest rank of the carriers remaining in the assigned office default carriers. If the AIN end office fails to route the call to the selected primary carrier, then it can route the call through the alternate or secondary carriers.

According to yet another embodiment of the invention, the system assigns values to each of the selected modes of calls for statistical and billing purposes.

According to an embodiment of the present invention, there is provided a method for routing a call based on a dialed number from a location to one of a plurality of interexchange carriers. The location has a predetermined sequence of ranked preferred Interexchange Carriers. The method comprises selecting one of a specific carrier and a default carrier, setting a primary carrier as the specific carrier when the specific carrier is selected, and to one of an authorized Primary Interexchange Carrier and a first ranked carrier of the predetermined sequence of ranked preferred carriers for the location when the default carrier is selected, selecting at least one alternate carrier sequentially from a highest remaining ranked carrier in the predetermined sequence of ranked preferred carriers, and sequentially routing the dialed number to the primary carrier and the at least one alternate carrier until a connection is established.

According to a feature of the above embodiment, the primary carrier is set to the first ranked carrier when the default carrier is requested and the Primary Interexchange Carrier is not an authorized carrier.

According to a further feature of the above embodiment, the method further includes providing at least one of a service code and a peg count code based upon at least one of the dialed number, the predetermined sequence of ranked preferred interexchange carriers, and a sequence formed by the primary carrier and the at least one alternate carrier.

According to a still further feature of the above embodiment, the method includes recording the at least one of the service code and the peg count code for later retrieval and statistical analysis.

According to a still further feature of the above embodiment, the recording includes recording data regarding the dialed number, the data including at least one of call time, call date, originating number, originating city, originating state, call duration, call disposition, an interexchange carrier selection sequence, trunk group used, dialed digits and destination number.

According to a still further feature of the above embodiment, the method includes recording the codes for later retrieval and billing.

According to a still further feature of the above embodiment, the method includes selectively overriding the calling party number with a dedicated number.

According to a still further feature of the above embodiment, the selecting and sequentially routing are not performed if the specific carrier is not an authorized carrier.

According to a still further feature of the invention, the selecting includes entering a prefix code with the dialed number.

According to a still further feature of the invention, the method further includes storing the predetermined sequence of ranked preferred carriers in a look up table, and consulting the look up table to locate the highest and next highest remaining ranked carrier.

According to another embodiment of the invention, there is provided a method for routing a government emergency call from one of a plurality of locations through one of a plurality of carriers. Each of the plurality of locations has predetermined ranking of preferred interexchange carriers. The method comprises recognizing the call at one location of the plurality of locations, setting a primary carrier, in order of preference, to one of an authorized manually selected carrier if entered, an authorized Primary Interexchange Carrier, and a first ranked carrier of the predetermined ranking of preferred carriers for the one of the plurality of locations, selecting an alternate and secondary carrier sequentially from a highest and next highest remaining carrier in the predetermined ranking of preferred carriers for the one location, respectively, and sequentially routing the call to interexchange carriers corresponding to the primary carrier, and alternate and secondary carriers when selected, until a connection is established.

According to a feature of the above embodiment, the method includes disconnecting a user if a code for an unauthorized carrier is requested by a user when dialing the call.

According to a further feature of the invention, each predetermined ranking of preferred carriers for each of the plurality of locations includes, in order of preference, the first carrier, and second and third carriers, wherein if a user does not manually select a carrier and the primary interexchange carrier is unauthorized, then the primary, alternate and secondary carriers are set to the first, second and third carriers for the one location.

According to a still further feature of the invention, each predetermined ranking of preferred interexchange carriers for the plurality of locations includes three carriers.

According to a still further feature of the invention, the method also includes recording data associated with the call, including at least one of a call time, a call date, an originating number, an originating city, an originating state, a call duration, a call disposition, an interexchange carrier, an interexchange carrier selection sequence, a trunk group used, dialed digits, and a destination number.

According to yet another embodiment of the invention, there is provided a network capable of routing a dedicated number through a plurality of interexchange carriers upon entry of the dedicated number and a request code. The network includes a device for dialing the dedicated number and the request code, a node connected to the device, and a central control connected to the node. The node has a predetermined sequence of three preferred carriers assigned to it.

The node requests carrier data from the central control responsive to entry of the dedicated number. The central control, responsive to a first condition of the request code, sets a primary carrier to one of the three carriers which has a carrier identification code that matches a predetermined portion of the request code. The central control, responsive to a second condition of the request code, disconnects the call. The central control, responsive to a third condition of the request code, sets a primary carrier to a Primary Interexchange Carrier for the node if the Primary Interexchange Carrier is authorized, and to a first ranked carrier of the three preferred carriers if the Primary Interexchange Carrier is not authorized. The central control, responsive to a fourth condition of the request code, sets an alternate carrier to a highest remaining rank carrier of the three carriers, and sets a secondary carrier to a next highest remaining rank carriers of the three carriers. The central control replies to the node with the carrier data, including at least the primary carrier, and the alternate and secondary carriers when set. The node routes the dedicated number to an interexchange carrier corresponding to the primary carrier. The node, responsive to a selection of alternate and secondary carriers by the central control and a failure of the node to connect with the interexchange carrier corresponding to the primary carrier, sequentially routes the dedicated number to an interexchange carrier corresponding to the alternate and secondary carriers until a connection is established.

According to a feature of the above embodiment, the network is an Advanced Intelligent Network, the node is an end office, and the central control is a service control point.

According to a further feature of the above embodiment, the first condition is entry of a code which request a specific authorized carrier, the second condition is entry of a code which does not correspond to an authorized carrier, the third condition is entry of a code which does not request a specific carrier, and the fourth condition is entry of a code which requests assignment of alternate and secondary carriers.

According to a still further feature of the above embodiment, the central control further provides classification data based on at least one of the requested code and the carrier data, wherein the classification data may be retrieved for at least one of statistical analysis and billing.

According to a still further feature of the above embodiment, the system also includes a mechanism which selectively changes a calling party number to match the dedicated number.

According to yet another embodiment of the invention, there is provided a system for improving the probability that calling a dedicated number will connect through a node to one of a plurality of interexchange carriers. The node has a predetermined sequence of preferred carriers assigned thereto. A mechanism recognizes the dedicated number. A mechanism assigns primary, alternate and secondary carriers responsive to the recognizing mechanism. A mechanism sequentially routes the dedicated number from the node to the interexchange carrier corresponding to the primary, alternate, and secondary carriers until a connection is established.

According to a feature of the above embodiment, the system also includes a mechanism that assigns classification data based on at least one of a code input with the dedicated number and the assigned primary, alternate, and secondary carriers. The classification data is used for at least one of statistical analysis and billing.

According to a still further feature of the above embodiment, the system is an advanced intelligent network, the node is an end office of the network, and the dedicated number is entered at a device connected to the end office.

According to yet another embodiment of the invention, there is provided a method for routing a call based on a dialed number from a location to one of a plurality of interexchange carriers, the location having a predetermined sequence of ranked preferred interexchange carriers. The method comprises, setting a primary carrier at one of an authorized Primary Interexchange Carrier and a first ranked carrier of the predetermined sequence of ranked preferred carriers for the location, selecting at least one alternate carrier sequentially from a highest remaining ranked carrier in the predetermined sequence of ranked preferred carriers, and sequentially routing the dialed number to the primary carrier and the at least one alternate carrier until a connection is established.

According to a feature of the above embodiment, the primary carrier is set to the first ranked carrier when the Primary Interexchange Carrier is not an authorized carrier.

According to further feature of the above embodiment, further comprising providing at least one of a service code and a peg count code based upon at least one of the dialed number, the predetermined sequence of ranked preferred interexchange carriers, and a sequence formed by the primary carrier and the at least one alternate carrier.

According to a still further feature of the above embodiment, the method further comprises recording the at least one of the service code and the peg count code for later retrieval and statistical analysis.

According to a still further feature of the above embodiment, the recording includes recording data regarding the dialed number, the data including at least one of call time, call date, originating number, originating city, originating state, call duration, call disposition, an interexchange carrier, an interexchange carrier selection sequence, trunk group used, dialed digits and destination number.

According to yet another feature of the above embodiment, the method further comprises recording the codes for later retrieval and billing.

According to a still further feature of the above embodiment, the location has a calling party number, and the method selectively overrides the calling party number with a dedicated number.

According to a still further feature of the above embodiment, the method further comprises storing the predetermined sequence of ranked preferred carriers in a look up table, and consulting the look up table to locate the highest remaining ranked carrier.

According to yet another embodiment of the invention, there is provided a method for routing a call from one of a plurality of locations through one of a plurality of carriers, each of the plurality of locations having a predetermined ranking of preferred interexchange carriers. The method comprises recognizing the call at one location of the plurality of locations, setting a primary carrier, in order of preference, to one of an authorized manually selected carrier if entered, an authorized Primary Interexchange Carrier, and a first ranked carrier of the predetermined ranking of preferred carriers for the one location, selecting, when the authorized manually selected carrier is not entered, an alternate and secondary carrier sequentially from a highest and next highest remaining carrier in the predetermined ranking of preferred carriers for the one location, respectively, and sequentially routing the call to interexchange carriers corresponding to the primary carrier, and the alternate, and secondary carriers when selected, until a connection is established.

According to a feature of the above embodiment, the method further comprises disconnecting a user if a code for an unauthorized interexchange carrier is requested by a user when dialing the call.

According to a further feature of the above embodiment, each predetermined ranking of preferred carriers for each of the plurality of locations includes, in order of preference, the first carrier, and second and third carriers. If a user does not manually select a carrier and the primary interexchange carrier is unauthorized, then the primary, alternate and secondary carriers are set to the first, second and third carriers for the one location.

According to a still further feature of the above embodiment, each predetermined ranking of preferred carriers for the plurality of locations includes three interexchange carriers.

According to yet another feature of the above embodiment, the method further comprises recording data associated with the call, including at least one of a call time, a call date, an originating number, an originating city, an originating state, a call duration, a call disposition, an interexchange carrier, an interexchange carrier selection sequence, a trunk group used, dialed digits, and a destination number.

According to still another embodiment of the invention, there is provided a network capable of routing a dedicated number through a plurality of interexchange carriers upon entry of the dedicated number and a request code. The network includes a device for dialing the dedicated number and the request code. A node is connected to the device. A central control is connected to the node. The node has a predetermined sequence of preferred carriers. The node requests carrier data from the central control responsive to entry of the dedicated number. The central control, responsive to a first condition of the request code, sets a primary carrier to one of the predetermined sequence of preferred carriers which has a carrier identification code that matches a predetermined portion of the request code. The central control, responsive to a second condition of the request code, disconnects the call. The central control, responsive to a third condition of the request code, sets the primary carrier to a Primary Interexchange Carrier for the node if the Primary Interexchange Carrier is authorized, and to a first ranked carrier of the predetermined sequence of preferred carriers if the Primary Interexchange Carrier is not authorized. The central control, responsive to the third condition of the request code, sets an alternate carrier to a highest remaining rank carrier of the predetermined sequence of preferred carriers, and sets a secondary carrier to a next highest remaining rank carriers of the preferred carriers. The central control replies to the node with the carrier data, including at least the primary carrier, and the alternate and secondary carriers when set. The node routes the dedicated number to an interexchange carrier corresponding to the primary carrier. The node, responsive to a selection of alternate and secondary carriers by the central control and a failure of the node to connect with the interexchange carrier corresponding to the primary carrier, sequentially routes the dedicated number to an interexchange carrier corresponding to the alternate and secondary carriers until a connection is established.

According to a feature of the above embodiment, the network is an Advanced Intelligent Network, the node is an end office, and the central control is a service control point.

According to a further feature of the above embodiment, the first condition is entry of a code which requests a specific authorized carrier, the second condition is entry of a code which does not correspond to an authorized interexchange carrier, and the third condition is entry of a code which does not request a specific carrier.

According to a still further feature of the above embodiment, the central control provides classification data based on at least one of the requested code and the carrier data. The classification data may be retrieved for at least one of statistical analysis and billing.

According to a still further feature of the above embodiment, the dedicated number is entered at a location having a calling party number. The system further includes a mechanism which selectively changes the calling party number to match the dedicated number.

The above-listed and other objects, features and advantages of the present invention will be more fully set forth hereinafter.

BRIEF DESCRIPTION OF THE DRAWINGS

The present invention is further described in the detailed description that follows, by reference to the noted plurality of drawings by way of non-limiting examples of preferred embodiments of the present invention, in which like references numerals represent similar parts throughout the several views of the drawings, and wherein.

DETAILED DESCRIPTION OF THE PREFERRED EMBODIMENTS

A. AIN Environment

Many telephone services may be provided using an AIN or AIN-type network arrangement for centralized control of telephone services offered to customers, as opposed to localized control of services at the Central Office (CO) or End Office (EO). An AIN system may be provided through interaction between switching points and other systems supporting AIN logic.

According to an aspect of the present invention, an apparatus and method for routing GETS calls may be implemented using an AIN or AIN-type network. In particular, an AIN network with at least AIN Release 0.0 or AIN Release 0.1 protocols and advanced intelligent network capabilities may be utilized to implement the various features and aspects of the invention. It should be noted, however, that the implementation of the present invention is not limited to AIN-based networks. Similarly, other advanced or intelligent networks and arrangements, other than the exemplary AIN system disclosed herein, may be used to implement the invention.

Figure 1:
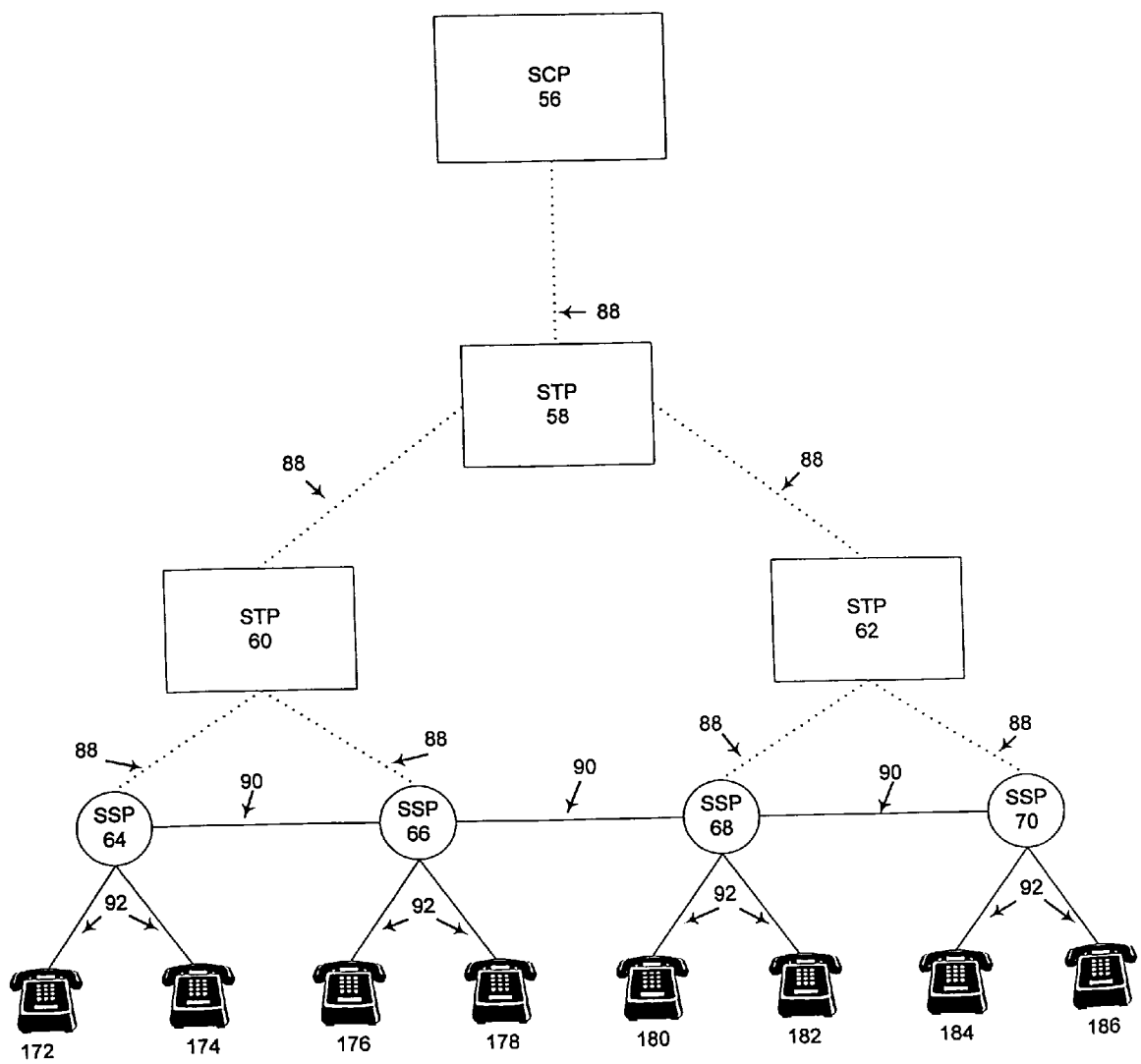
FIG. 1 illustrates an exemplary block diagram of the basic components of a conventional, Advanced Intelligent Network (AIN) system.
Figure 2:
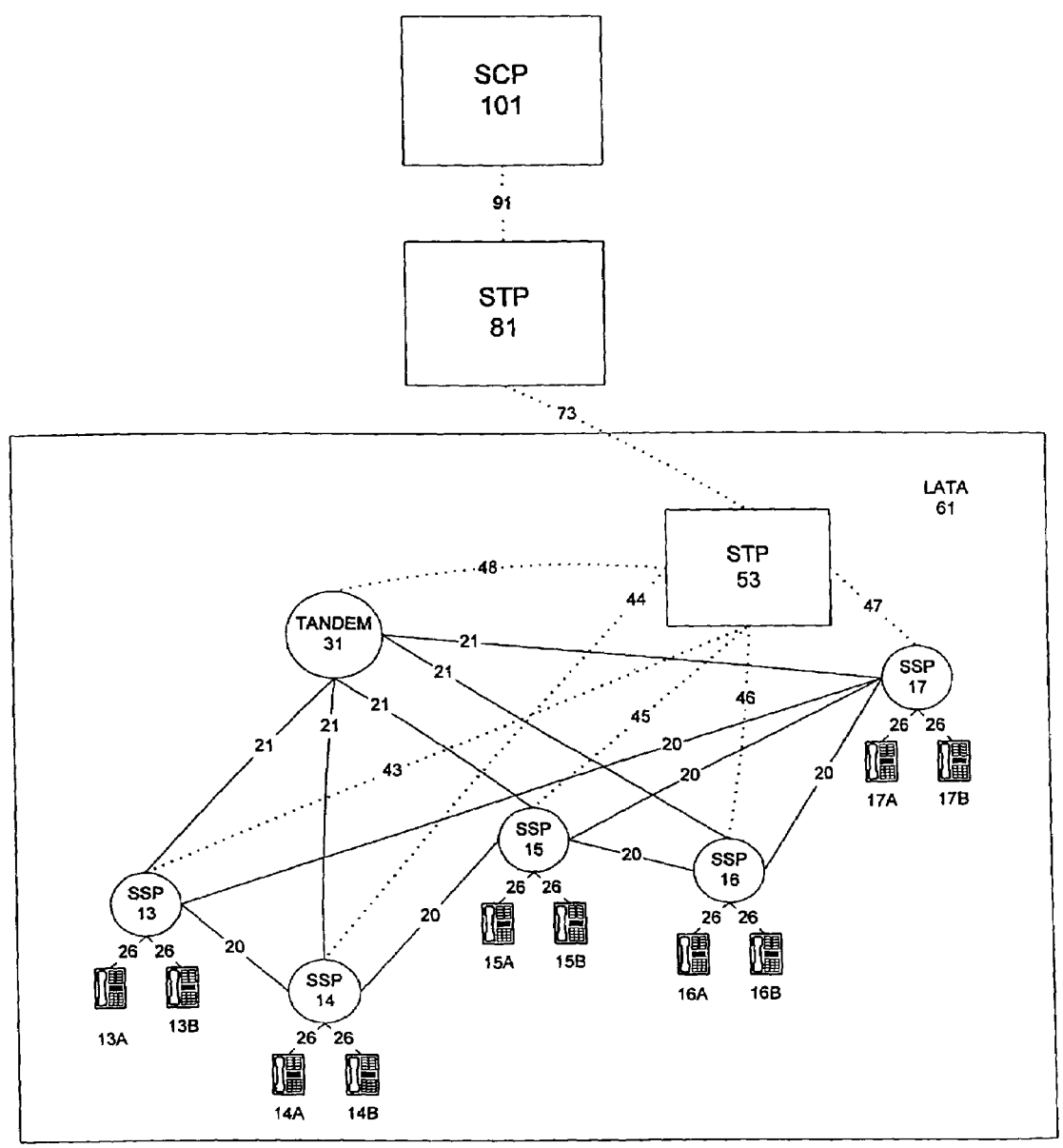
FIG. 2 illustrates, in a general block diagram form, an Advanced Intelligent Network (AIN) based system for implementing automatic routing features, in accordance with an embodiment of the present invention.

Referring now to the accompanying drawings, FIG. 2 illustrates an AIN-based network arrangement for implementing the invention. In the embodiment of FIG. 2, a telephone network within LATA 61 is provided that defines a calling service area. The LATA 61 includes stations, e.g., stations 13A, 13B, 14A, 14B, 15A, 15B, 16A, 16B, 17A and 17B, and corresponding switches, e.g., service switching points (SSP) or end offices (EO) 13, 14, 15, 16 and 17. The EO's 13, 14, 15, 16 and 17 may comprise, for example, 1AESS or 5ESS switches manufactured by, for example, Lucent Technologies, Inc., having AIN Release 0.1 capabilities and protocols, DMS-100 switches manufactured by, for example, Nortel having AIN Release 0.1 capabilities and protocols, AXE-10 switches manufactured by, for example, Ericsson having AIN Release 0.1 capabilities and protocols, or 1AESS switches, additionally having AIN Release 0.0 capabilities and protocols. Additionally, having AIN Release 0.0 capabilities and protocols may be possible for the DMS-100 and 5ESS switches. Further, in accordance with an aspect of the present invention, as new AIN Releases and protocols (e.g., AIN Release 0.2) are introduced, the capabilities of the SSP's and the service logic of the present invention may be upgraded accordingly.

As presently contemplated, routing of GETS calls is applicable to offices having the 5ESS, DMS-100, and 1AESS switches with AIN Release 0.1 capabilities and protocols, and to a lesser extent through 1AESS switches with AIN release 0.0 protocols. Additionally, it may be possible to utilize the system with other switches noted above, including upgrades as issued.

In the example shown in FIG. 2, each switch may include different types of facilities and/or triggers. Generally, SSP's 13–17 are each programmable switches which: recognize AIN-type calls; launch queries to service control point (SCP) 101; and, receive commands and data from SCP 101 to further process and route AIN-type calls. When one of the SSP's is triggered by an AIN-type call, the triggered SSP formulates an AIN service request and responds to call processing instructions from the network element in which the AIN service logic resides. According to an aspect of the invention, the AIN service logic may reside in a database at SCP 101.

As further shown in FIG. 2, either a direct route or a tandem route may exist between all switches. In LATA 61, direct trunks 20 exist between SSP 13, SSP 14, SSP 15, SSP 16 and SSP 17. Assuming LATA 61 to be a large service area, direct trunks may not be available between each switch, either due to geographical limitations or due to excessive traffic. For example, SSP 13 may alternatively use tandem trunk 21 to a tandem switch 31 and may use trunk 20 to SSP 17 to terminate an offered call. This alternative path may be an overflow route for traffic that cannot find room on trunk 20 between SSP 13 and SSP 17. Trunks 21 may be either SS7, controlled multi-frequency trunks (MF), or primary rate interface (PRI) trunks, and the type of trunk will be in accordance with both the sending and receiving SSP to which it is connected. If either of the SSP's is a 1AESS type switch, the trunk will either be an SS7 or controlled MF type trunk, as the 1AESS is not capable of supporting PRI trunks. However, if both the sending and receiving switches are either a DMS-100 switch or a 5ESS switch, the trunk may be either an SS7, a controlled MF type trunk, or PRI type trunk.

Each office equipped as an AIN SSP may allow normal switch processing to be suspended at specific points in a call so that the switch may send an AIN message query to SCP 101. Service control point 101 may execute software based service logic and return call processing instructions to the triggering AIN SSP. In addition, SCP 101 may comprise an Integrated Service Control Point (ISCP). New services may be provisioned by assigning AIN SSP triggers to customer lines, trunks, and/or NANP telephone numbers. As noted above, the SSP's may include, but are not limited to, 5ESS, 1AESS, and DMS-100 switches. The 5ESS switches may utilize an AIN Release 0.1 protocol and should be equipped with Generic 5E9.1 (or higher) software and associated AIN SSP features in order to serve customers. The 1AESS switches may use an AIN Release 0.0 protocol or an AIN Release 0.1 protocol, and should be equipped with Generic 1AE12.03 (or higher) software and associated AIN SSP features in order to serve customers. The DMS switches may utilize an AIN Release 0.1 protocol and should be equipped with Generic NA003 (or higher) software and associated AIN SSP features. Specifications of AIN Release 0.1 SSP's may be found in Bellcore documents TR-NWT-001284, "Advanced Intelligent Network Release 0.1 Switching System Generic Requirements", Issue 1 (August 1993), and TR-NWT-001285, "Advanced Intelligent Network 0.1 Switch-Service Control Point Application Protocol Interface Generic Requirements", Issue 1 (August 1992) from Bell Communications Research,. Inc., of Livingston, N.J., the disclosures of each document is incorporated by reference herein in its entirety.

As described above, within LATA 61 is a tandem switch 31 that is connected to each of the SSP's 13–17. The tandem switch 31 is coupled to each of the SSP's 13–17 of LATA 61 by trunks 21. Trunks 21 may interconnect tandem switch 31 with each SSP within LATA 61 for routing telephone calls. However, trunks 21 may also be used to connect tandem switch 31 to, e.g., toll calls that terminate on SSP's (not shown) outside LATA 61; and, calls originating outside of LATA 61 but terminating on an SSP within LATA 61.

As noted above, the SCP 101 may comprise an Integrated Service Control Point (ISCP). The ISCP (not shown) is an integrated system which may include a service management system (SMS), a data and reports system (DRS), a programmable service control point (SCP), and a service creation environment (SCE). The SCE may be provisioned as a terminal implemented to work with SMS to create, modify, and load services into the SCP database. The SCE may comprise, for example, a programming environment (such as the SPACE$^{SM}$ programming environment that is available from Bellcore) for creating and provisioning services. The SCP may execute software-based service logic and return call routing instructions to the triggering SSP's. The SMS may be provided for administrative purposes to synchronize customer CPR and data on the mated pair of ISCP's that SCP 101 represents. The DRS may be provided for compiling call information to be used for billing and administrative purposes. By way of example, the ISCP may be implemented with a Bellcore Integrated Service Control Point (ISCP), loaded with preferably at least ISCP software Version 4.0 (or higher), available from Bell Communications Research, Inc., of Livingston, N.J.

In order to facilitate signaling and data messaging, each SSP and tandem switch within the multiple location AIN is equipped with Common Channel Signaling (CCS) capabilities, e.g., Signaling System 7 (SS7), which provides two-way communications of data messages over CCS links 43, 44, 45, 46, 47, 48, 73 and 91 between each SSP and tandem switch 31 and the SCP 101. The data messages may be formatted in accordance with the Transaction Capabilities Applications Part (TCAP). Alternatively, ISDN User Part (ISUP) may be used for signaling purposes between, for example, SSP's 13–17. In such a case, the SSP's may be equipped with the capability to map appropriate data between TCAP and ISUP protocols, and vice versa. The telephone network essentially employs an upper-level software controlled network through the Signaling Transfer Points (STP's) and the SCP (and/or ISCP). The software presides over the hardware to check the call route and the availability of connection prior to hardware connection.

Accordingly, the connections by links 43–48, link 73, and link 91 through STP's 53 and 81 are for signaling purposes, and allow each of the SSP's 13–17 to send and receive messages to and from SCP 101 via the STP's. As shown for example in FIG. 2, a local STP 53 may act as the data messaging control point for LATA 61. That is, all data messages from SSP's within LATA 61 or directed to SSP's within LATA 61 may be transmitted through STP 53. Accordingly, CCS links 43–48 are shown establishing a data link between STP 53 and either the tandem switch 31, SSP 13, SSP 14, SSP 15, SSP 16 or SSP 17. Further, one or more regional STP's may be provided for data messaging with each of the LATA. In FIG. 2, regional STP 81 is illustrated as receiving and transmitting data messages with LATA 61 by connecting to STP 53 by line 73 and connecting to SCP 101 by link 91.

B. Communications Network Triggers and Hardware

1. AIN Triggers

The AIN may include at least three AIN triggers that may be implemented on the above-described AIN SSP's to facilitate accessing the routing features for dedicated or GETS calls. The 5ESS, DMS-100, and 1AESS AIN SSP's may be provisioned with a termination attempt trigger (TAT), and a 10 digit trigger (10D). The 1AESS AIN SSP may be provisioned with a dialed line number trigger (DLN), which is equivalent to the TAT. According to the present invention, other types of triggers may also be quickly and easily added.

The preferred trigger for use with the present invention is the 10 digit trigger. The 10 digit trigger is an office based trigger that may be assigned to a dialed number, and is associated with AIN Release 0.1. Accordingly, the 10 digit trigger may be programmed to recognize a dedicated or designated telephone number and to trigger AIN functionality in response to recognizing the designated telephone number.

On the 5ESS switch, a 10D trigger is preferable if there are more than, for example, 99 simultaneous trigger events expected per TN.

2. Service Control Point

The AIN herein may require several service logic programs (or call processing records (CPR)) to fully implement the subscriber's desired service features within a single network. Each CPR may be triggered based on calls initialed by or placed to the subscriber. The trigger CPR may have one or more graphs to permit a subscriber's telephone number to be compatible with different AIN releases. For example, each subscriber may have a TN associated with a trigger CPR having a trigger graph for an AIN Release 0.0 implementation of subscribed service, and a trigger graph for an AIN Release 0.1 implementation of the subscribed service. However, common service logic for both AIN releases may be in the same CPR with protocol particular logic. The CPR may have a number of associated tables to be accessed by the SCP in implementing the particular service logic. It is also noted that each terminating and originating station may have a trigger CPR, depending on the trigger implemented by the provisioner. Generally, a trigger CPR may be small and may include one or more graphs. Each graph within a trigger CPR may include at least two nodes (i.e., branch points within the service creation logic). For example, the graph may contain interconnected nodes to provide the service creation logic. In addition, each trigger CPR may include at least one call variable used by each graph to create the appropriate service logic. A graph may also use constants and call variables in executing the service logic. In addition, the call variables may be exclusive to a graph, shared among all graphs of a CPR, or shared among multiple CPR's. Call variables may be predefined from SS7 queries or for use in SS7 responses. Predefined call variables are typically related to messages (e.g., query, conversational, or response) between the SSP and the ISCP or ISCP and machine constants, such as time-of-day. A particular type of call variable may be an embedded table. Call variables may be service creator defined and may include subscriber supplied data, or may be temporarily defined during the execution of the service logic. Further, call variables may be restricted to the graph in which it is defined or to the CPR in which it is defined. A stand alone table is a unique object at the same level as a CPR. Embedded tables and stand alone tables are not a subset of CPR's equivalent to graphs in the SCP.

At the SCP, a CPR that has been converted into an object is called a template. A template "freezes" the service logic and allows user defined call variables to be reset to provisionable parameters that have label fields in the template to assist the user in setting the value of provisionable parameters.

The service provisioner needs to know the AIN release or version of each network station's serving SSP because the SCP may use the telephone number and the AIN trigger type to generate a unique key or code for access to AIN functionality. Because AIN Release 0.1 and AIN Release 0.0 are different, some aspects of a service may need to be separated according to the AIN release. Further, to create a unique key for access to AIN functionality, the AIN release may be needed to ensure that the proper service creation features and the protocols are utilized for effective and accurate communication with the SSP.

According to the present invention, the trigger CPR may include separate graphs or service logic for each trigger (e.g., TAT, 10D and DLN), so as to support all trigger types within one set of subscriber provided data for call variables. Separate CPR's or graphs may also be provided for each of AIN Release 0.0 and Release 0.1 in order to improve performance; however, it is possible to use a single CPR to support the service features of the invention across AIN releases, as the individual tables stored in the SCP may be designed to accommodate all AIN versions of the present service. Accordingly, the CPR may need to know what type of SSP is providing the AIN trigger and query message. The present invention may be adapted for use with terminating triggers or originating triggers. The terminating (or originating, if applicable) trigger CPR may be designed to transfer control to an appropriate "transfer in" graph to translate the switch commands into common call variables usable by the CPR to continue the service logic. Use of the "transfer in" graph ensure maximum software reuse but may decrease SCP performance (capacity). A major function of the "transfer in" graph is to transform data in either AIN Release 0.0 or in AIN Release 0.1 protocol to generic, protocol insensitive values that the common service logic CPR can process. At the end of the common service logic CPR, control is transferred over to a "transfer out" graph to prepare an appropriate protocol response to send back to the SSP. Optionally, rather than employing a "transfer in" graph, the predefined call variables from the query and provisionable parameters may be used as is to transfer control.

When the triggering event, i.e., termination or origination of the offered call, occurs, the SSP may send a query for that calling party number (CPN) to the SCP. The SCP may use the CPN for screening and/or billing purposes as defined in the CPR.

C. Government Emergency Telecommunications Service

Figure 3:
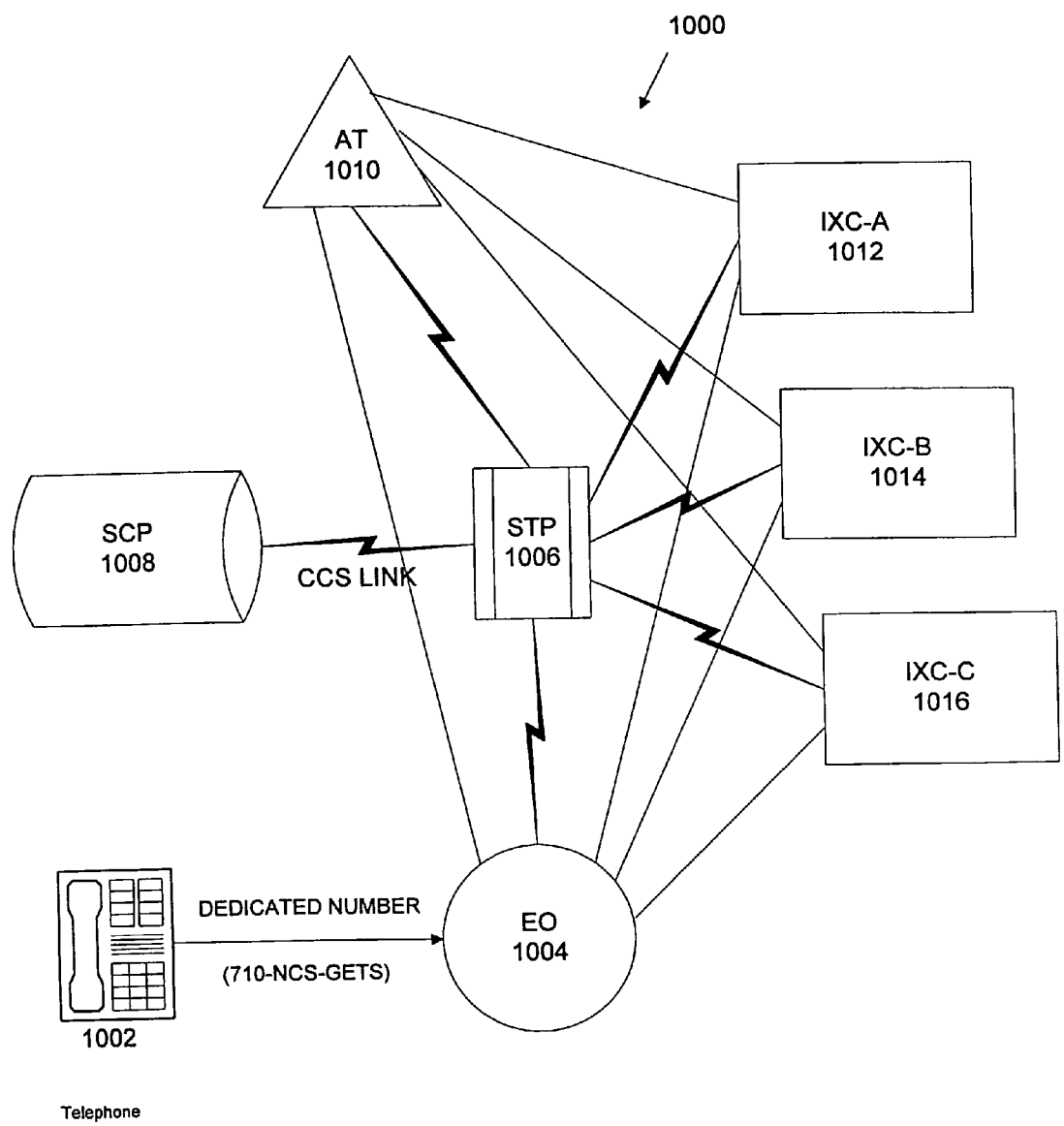
FIG. 3 illustrates the basic schematic of the present invention in an AIN system.

Referring now to FIG. 3, an exemplary GETS ACR system of the present invention is shown generally at 1000. In FIG. 3, a telephone 1002, End Office (EO) 1004, STP 1006, SCP 1008 having an ISCP, and Access Tandem (AT) 1010, may be configured to the corresponding elements in the above described AIN system environment of FIG. 2. The preferred features of the invention will be described below with reference to the noted AIN environment. However, the invention is not so limited, as the present invention may be used with non-AIN systems or AIN's having other configurations.

As shown in FIG. 3, telephone 1002 connects to EO 1004, which may be configured as an SSP. EO 1004 communicates with SCP 1008 through STP 1006 and CCS links, and routes or transfers calls to an Access Tandem 1010 through a trunked line. Interexchange carriers (IXC's) 1012, 1014, and 1016, connect to AT 1010, STP 1006, and EO 1004.

When the GETS ACR system is installed for an EO 1004, that office is assigned by the GETS manager or administrator (currently GTE) a predetermined sequence or ranking of preferred carriers. For example, one office may be assigned AT&T as primary carrier, MCI as alternate carrier, and Sprint as secondary carrier. In the preferred embodiment, these three carriers are used to fill the three carrier slots, providing six possible permutations of primary, alternate, and secondary carriers.

To implement GETS ACR, the telephone number 710-NCS-GETS is assigned a ten (10) digit trigger for EO 1004. Once the trigger is assigned and activated, EO 1004 responds to every GETS ACR call to 710-NCS-GETS by sending an AIN query message to SCP 1008 through STP 1006 and the SS7 network. SCP 1008 executes the GETS ACR logic to select at least a primary carrier, as well as alternate and secondary carriers when requested.

The user can manually select a carrier or request automatic assignment of carriers when placing the GETS call (710-NCS-GETS) by dialing a prefix code (e.g., 0, 1, or 10XYZ, where X, Y, and Z are any digit between 0 and 9). The following routing selections are contemplated for the preferred embodiment:

(1) 10XYZ+1+GETS call: carrier with a carrier identification code (CIC) which corresponds to the XYZ code is selected as the primary carrier; alternate and secondary carriers are selected from the rank of the remaining assigned carriers.

(2) 10XYZ+0+GETS call: carrier with a CIC which corresponds to the XYZ code is selected as the primary carrier; no alternate and secondary carriers are selected.

(3) 0+GETS call: MCI is selected as primary carrier; no alternate and secondary carriers are selected.

(4) 1+GETS call: primary, alternate and secondary carriers are assigned automatically based on the local PIC and the rank order of the remaining carriers.

If an entered XYZ code does not correspond the CIC of an authorized/recognized Interexchange Carrier (IXC), then the system disconnects the call.

Figure 4:
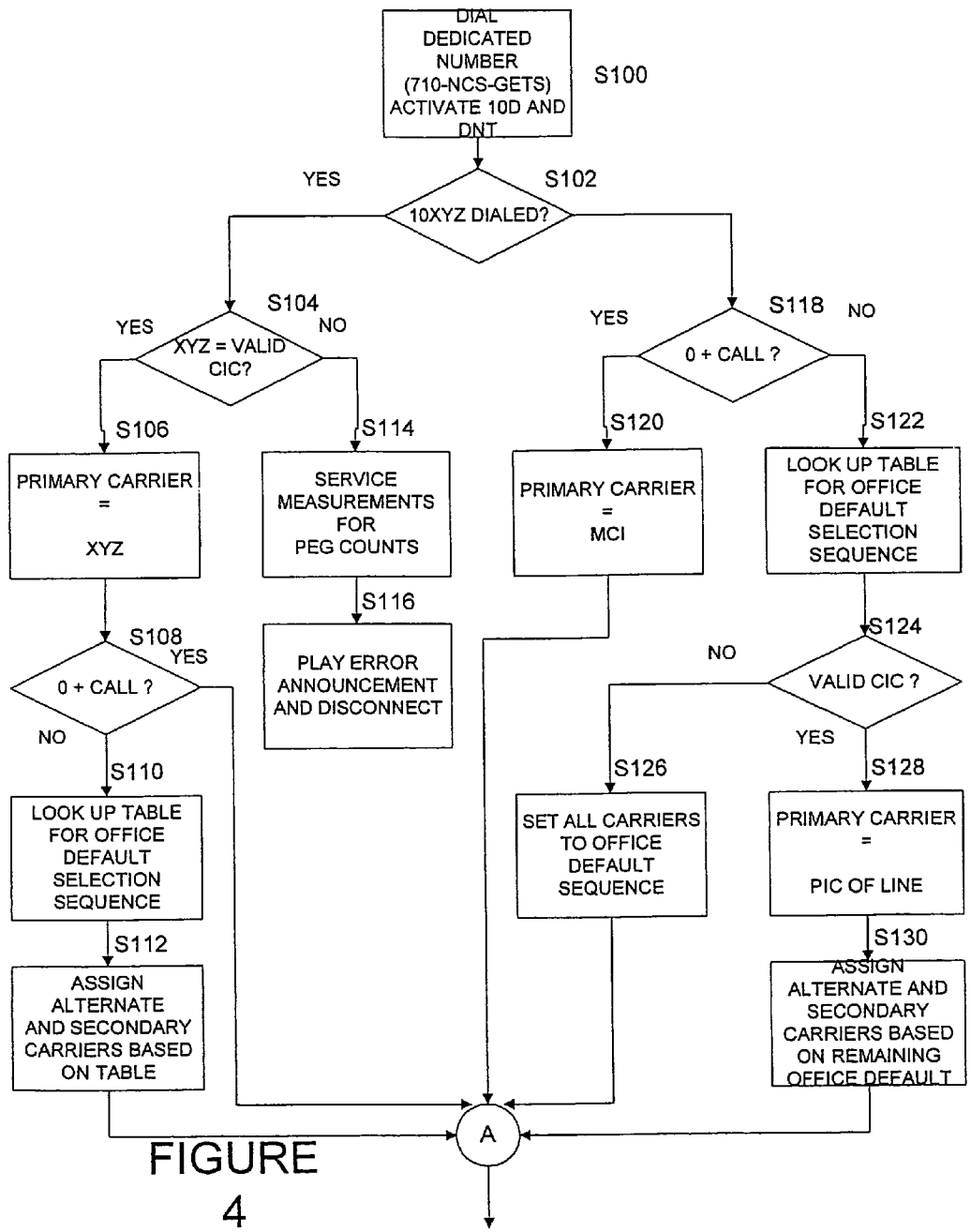
FIG. 4 illustrates a flow chart of the service logic to select carriers when a user places a call to GETS.

A detailed flowchart of the program and operations by which the appropriate carriers are selected is shown in FIG. 4. At step S100, EO 1004 recognizes the entry of the GETS call (i.e., 710-NCS-GETS) and executes the appropriate AIN trigger (such as a Dialed Number Trigger (DNT) or a 3/6/10 digit AIN trigger), and sends a query message to SCP 1008. At step S102, SCP 1008 executes the GETS ACR logic based on the received query message to first determine whether the call was preceded by a five digit code 10XYZ. If so, the service logic compares the XYZ code with the CIC's of the recognized carriers. For example, the presently utilized CIC's are 288 for AT&T, 222 for MCI, and 333 for Sprint; accordingly, SCP 1008 will recognize 10288 as a selection of AT&T, 10222 and a selection of MCI, and 10333 as Sprint.

If the XYZ code does not correspond to the CIC of any recognized carrier, then control proceeds to step S114 for a peg count (in which the system issues a peg value code indicating that the caller dialed an invalid code for later statistic analysis) of the call. The system finally disconnects the call after playing an error message at step S116.

If the XYZ matches one of the recognized carriers, then the service logic sets the primary carrier to the carrier with the corresponding CIC at step S106. The service logic then determines whether selection of alternate and secondary carriers is necessary at step S108 based on whether the 10XYZ+0+GETS call was dialed. If so, then no alternate or secondary carriers are selected, and control proceeds to the execution subroutine at step S132 (see FIG. 5).

If the 10XYZ code is not followed by a zero (i.e., 10XYZ+1+GETS call) then the service logic consults a lookup table in SCP 1008 for the assigned primary, alternate, and secondary carriers for the AIN EO (e.g., EO 1004)

which is the source of the GETS ACR call; the carriers for each EO are preferably ranked according to a predetermined or default list of interexchange carrier's stored in SCP 1008. At step S112, the highest remaining ranked carrier (HRR) is assigned as the alterative carrier, while the next highest remaining ranked carrier (NHRR) is assigned as the secondary carrier. By way of example, suppose that a particular AIN office has assigned default carriers as follows: primary=AT&T (288); alternate=MCI (222); and secondary=Sprint (333). If a user inputs 10222+1+call, MCI is selected as the primary carrier, AT&T as the alternate carrier (as the highest ranking remaining carrier), and Sprint as the secondary (as the next highest remaining carrier). Similarly, if a user inputs 10333+1+call, Sprint is selected as the primary carrier, AT&T as the alternate carrier (as the highest ranking remaining carrier), and MCI as the secondary (as the next highest remaining carrier).

With the alternate and secondary carriers now selected, control proceeds to the execution sequence at step S132 (discussed below with reference to FIG. 5).

Returning to step S102, if the user did not input a 10XYZ prefix (i.e., only a 1 or 0 prefix was entered), then control proceeds to step S118 to determine whether a zero prefix was entered. If so, then MCI is selected as the primary carrier without alternate or secondary carriers by the SCP 1008 at step S120; control then proceeds to step S132.

If the prefix is not zero, the service logic looks up the assigned default carriers at step S122. At step S124, the system determines whether the Primary Interexchange Carrier (PIC) to which the calling station is automatically connected is an authorized carrier (i.e., one of the default carriers or other specifically designated carrier). If not, then the primary, alternate, and secondary carriers are set at the office default settings at step S126, whereupon control proceeds to the execution subroutine at step S132. If the PIC is an authorized carrier, then the primary carrier is set to the PIC, while the alternate and secondary carriers are selected as the highest and next highest remaining rank carriers, respectively; control then proceeds to step S132 (see FIG. 5).

Based on the above service logic flows, various possible permutations of dialed numbers and assigned carriers based on a three carrier system using, for example, AT&T, MCI, and Sprint are possible. Table 1 below indicates the exemplary permutations of dialed numbers and assigned carriers according to an aspect of the present invention.

TABLE 1

| CALLER DIALS | PIC is: | PRIMARY CXR | ALTERNATE CXR | SECONDARY ALTERNATE CXR |
|---|---|---|---|---|
| 1 + 710 + NCS + GETS | AT&T | AT&T | Highest Remaining Ranked (HRR) | Next Highest Remaining Ranked (NHRR) |
| 1 + 710 + NCS + GETS | MCI | MCI | HRR | NHRR |
| 1 + 710 + NCS + GETS | SPRINT | SPRINT | HRR | NHRR |
| 1 + 710 + NCS + GETS | OTHER | OFFICE DEFAULT | OFFICE DEFAULT | OFFICE DEFAULT |
| 0 + 710 + NCS + GETS | AT&T | MCI | NONE | NONE |
| 0 + 710 + NCS + GETS | MCI | MCI | NONE | NONE |
| 0 + 710 + NCS + GETS | SPRINT | MCI | NONE | NONE |
| 0 + 710 + NCS + GETS | OTHER | MCI | NONE | NONE |
| 10222 + 0 + 710 + NCS + GETS | NA | MCI | NONE | NONE |
| 10288 + 0 + 710 + NCS + GETS | NA | AT&T | NONE | NONE |
| 10333 + 0 + 710 + NCS + GETS | NA | SPRINT | NONE | NONE |
| 10XYZ + 0 + 710 + NCS + GETS | NA | BLOCK | NONE | NONE |
| 10222 + 1 + 710 + NCS + GETS | MCI | MCI | HRR | NHRR |
| 10288 + 1 + 710 + NCS + GETS | AT&T | AT&T | HRR | NHRR |
| 10333 + 1 + 710 + NCS + GETS | SPRINT | SPRINT | HRR | NHRR |
| 10XYZ + 1 + 710 + NCS + GETS | NA | BLOCK | NONE | NONE |

Legend:
Other: CIC not equal to 288, 222 or 333 (CIC's of AT&T, MCI, or Sprint);
Block: Terminate call;
NA: Not Applicable/Irrelevant; and
Office Default: Assigned by manager and stored in SCP 1008.

Figure 5:
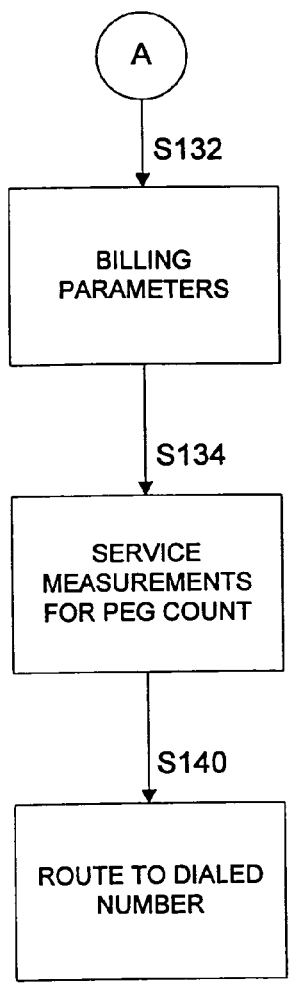
FIG. 5 illustrates a flow chart of the service logic to route the call after the carriers are selected.

The execution subroutine is shown in FIG. 5. At steps S132 and S134, the service logic determines billing parameters and service measurements for peg counts. Specifically, the system will assign values to Service Feature Codes and Peg Court values. These codes, as well as other information associated with the call (e.g., call time, call date, originating number, originating city, originating state, call duration, call disposition, an IXC selection sequence, trunk group used, dialed digits or destination number, etc.) are collected by a data distributor and sent to downstream information services for statistical analysis, billing or other reports. A list of preferred service codes and peg counts are shown below in Tables 2 and 3, respectively.

TABLE 2

| | ACR Office Selection # | | | | | |
|---|---|---|---|---|---|---|
| | 1 | 2 | 3 | 4 | 5 | 6 |
| Primary Carrier | 288 | 288 | 222 | 222 | 333 | 333 |
| Alternate Carrier | 222 | 333 | 288 | 333 | 288 | 222 |
| Secondary Carrier | 333 | 222 | 333 | 288 | 222 | 288 |
| AIN 0.1 AMA Service Feature Code (Call Code 840) | 991 | 992 | 993 | 994 | 995 | 996 |
| AIN 0.0 AMA Service Feature Code (Call Code 843) | 091 | 092 | 093 | 094 | 095 | 096 |

TABLE 3

| Category | Result | Peg Count Value |
|---|---|---|
| 1 | Returned Selection Sequence is 1 | 01 |
| 2 | Returned Selection Sequence is 2 | 02 |
| 3 | Returned Selection Sequence is 3 | 03 |
| 4 | Returned Selection Sequence is 4 | 04 |
| 5 | Returned Selection Sequence is 5 | 05 |
| 6 | Returned Selection Sequence is 6 | 06 |
| 7 | Caller dialed invalid 10XYZ | 07 |
| 8 | Caller dialed 0+ | 08 |
| 9 | Caller dialed 10288 + 0 (AT&T) | 09 |
| 10 | Caller dialed 10333 + 0 (Sprint) | 10 |
| 11 | Caller dialed 10222 + 0 (MCI) | 11 |

Having logged the statistical information, SCP 1008 routes the above determined information back to EO 1004 in the form of an SS7 query response. EO 1004 then routes the dialed number at step S140 from EO 1004 to the interexchange carrier corresponding to the primary carrier. If the EO 1004 cannot initiate a connection with that interexchange carrier (e.g. the primary carrier or connecting lines experiences system overload, mechanical difficulties, or catastrophic failure) the system routes the dialed number through the interexchange carrier corresponding to the alternate carrier. If EO 1004 cannot connect with the alternate carrier, then the it routes the call to the interexchange carrier corresponding to the secondary carrier.

The ability of the AIN network to perform all of the above steps, and the type of information exchanged between EO 1004 and SCP 1008 depends on the type of trigger at the AIN EO. Specifically, for an AIN SSP 10 digit trigger at AIN 0.1 SSP EO (using 5ESS and/or DMS switches), then the query message to SCP preferably contains the following information:

Crit-Type=NPANXXXXXX
Signaling Point Code of Office User Id=Calling Party DN
Called Party Id=7106274387
  NoN=National/Operator Req.
Calling Party Id=Calling Party TN
Primary Carrier=PIC of Line or 10XYZ-selected CIC
Carrier Selection=Was 10XYZ dialed?

For a typical response message to EO 1004, SCP 1008 preferably responds with the following information:

Called Party Id=7106274387
  NoN=National/Operator Req.
Designation of Primary, Alternate, and Secondary Carriers
Calling Party Id=7106274387
AMASLPID=438700101
Overflow Billing Indicator
  Call code=840
  Service Feature Code (as assigned 990–996)
AMA Line Number=CPN of originating caller For a DNT trigger at an AIN 0.0 SSP EO (using a 1AESS switch), the information preferably contained in the query message is as follows:

Service Key 710-627-4387
Signaling Point Code of Office
AIN=Calling Party AIN
  NoN=National
Carrier ID=PIC of Line or 10XYZ-selected CIC
Originating Station=CPN SCP 1008 preferably sends the following information with the query response message:

Routing Number=7106274387
  NoN=National
Designation of Primary, Alternate, and Secondary Carriers
Billing Indicator
  Call code=843
  Service Feature Code (as assigned 091–096)
Billing Number=AIN of originating line As noted above, the above communication protocols are described for use with the AIN system described herein. However, as the present invention also operates with non-AIN systems, AIN's having different configurations, and software upgrades, protocols can be easily modified by those skilled in the art to accommodate such systems.

Figure 6:
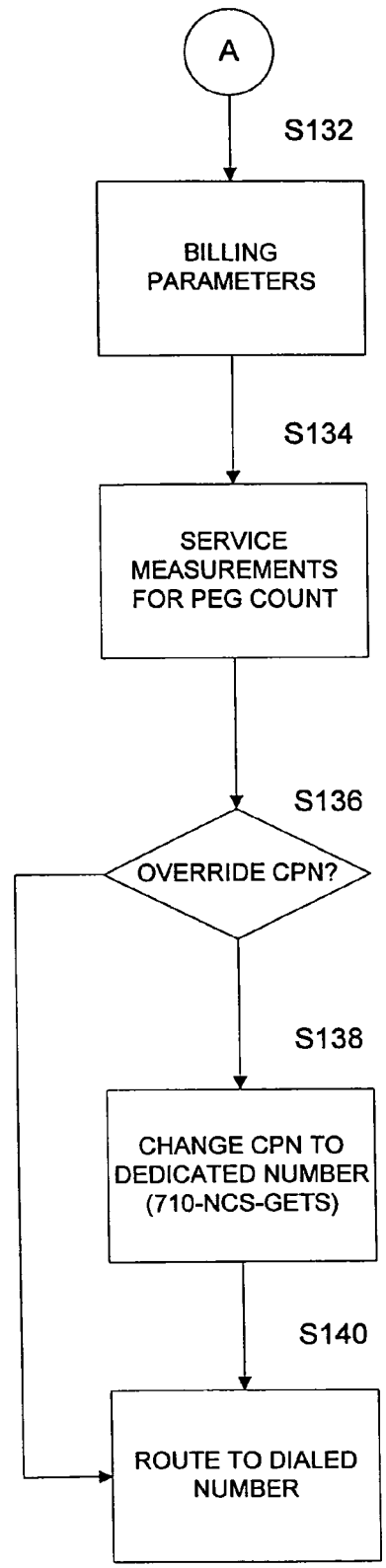
FIG. 6 illustrates, in accordance with another aspect of the invention, a flow chart of the service logic after the carriers are selected to override a calling party number.

A feature of the present invention for use during the execution subroutine is shown in FIG. 6. Steps S132, S134 and S140 are the same as those discussed above with reference to FIG. 5. Steps S136 and S138 relate to a feature of the invention to change the network calling party number (CPN) information from the value of the actual calling party to a GETS unique value (710-627-4387) for all GETS ACR calls. The GETS unique CPN is passed along with other call information through the network to the interexchange carrier. The AMA record will record the originating and terminating number as the 710-NCS-GETS number. This feature can be activated by a simple toggle switch at the central control/SCP 1008.

The above description is dedicated to the use of a dedicated number over the normal POTS trunk. However, pay phone call traffic (1+coin) is normally sent over a specially translated trunk group. For certain switches (presently the 5ESS and DMS-100), the GETS call may be completed without the need for coins. Accordingly, in such a configuration, carriers AT&T, MCI, and Sprint send 1+coin calls to GETS over their normal POTS trunk group. The 710+NCS+GETS number is removed from the normal dialing plan, and treated as a domestic call so the call is routed along the normal route to the carrier rather than the coin route. Other 710 type calls will use the coin route as appropriate. Further, since switches generally treat 1+coin calls as if AT&T is the PIC, AT&T will always be returned as the primary carrier, while the alternate and secondary carriers are selected from the remaining default settings. However, it is within the skill in the art to set the primary carrier to either MCI or Sprint for a particular pay phone.

Figure 7:
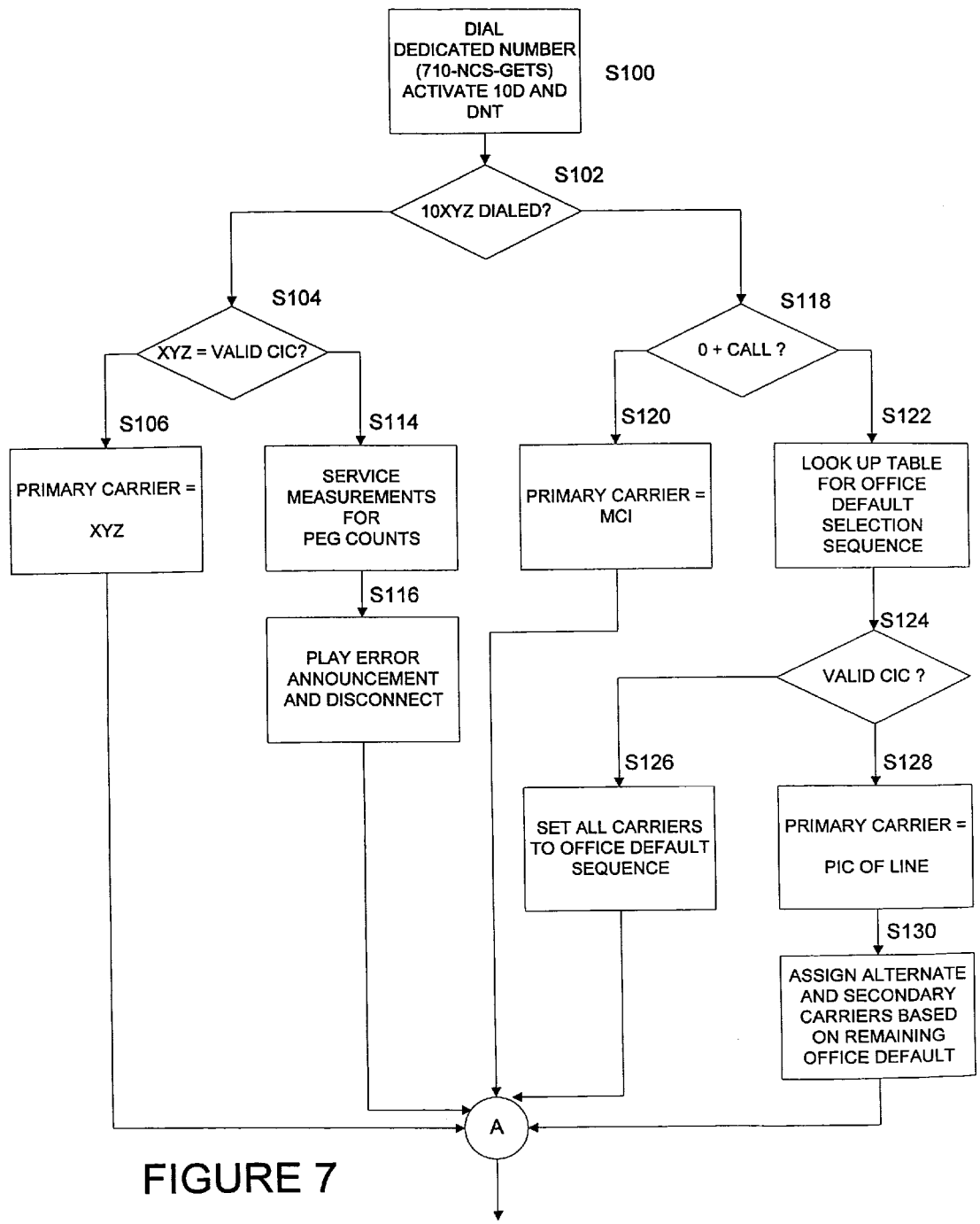
FIG. 7 illustrates a flow chart of the service logic to select carriers when a user places a call to GETS according to a second embodiment of the invention.

A second embodiment of the service logic of the invention is shown in FIG. 7. In this service logic, entry 10XYZ requests a primary carrier without selection of alternate or secondary carriers, regardless of whether followed by 0 or 1. Thus, FIG. 7 is the same as FIG. 4, save for the removal of steps S108–S112. The resultant permutations of dialed numbers and assigned carriers, and the resulting peg counts, are shown below in Tables 4 and 5.

TABLE 4

| CALLER DIALS | PIC is: | PRIMARY CXR | ALTERNATE CXR | SECONDARY ALTERNATE CXR |
|---|---|---|---|---|
| 1 + 710 + NCS + GETS | AT&T | AT&T | Highest Remaining Ranked (HRR) | Next Highest Remaining Ranked (NHRR) |
| 1 + 710 + NCS + GETS | MCI | MCI | HRR | NHRR |
| 1 + 710 + NCS + GETS | SPRINT | SPRINT | HRR | NHRR |
| 1 + 710 + NCS + GETS | OTHER | OFFICE DEFAULT | OFFICE DEFAULT | OFFICE DEFAULT |
| 0 + 710 + NCS + GETS | AT&T | MCI | NONE | NONE |
| 0 + 710 + NCS + GETS | MCI | MCI | NONE | NONE |
| 0 + 710 + NCS + GETS | SPRINT | MCI | NONE | NONE |
| 0 + 710 + NCS + GETS | OTHER | MCI | NONE | NONE |
| 10222 + 0 + 710 + NCS + GETS | NA | MCI | NONE | NONE |
| 10288 + 0 + 710 + NCS + GETS | NA | AT&T | NONE | NONE |
| 10333 + 0 + 710 + NCS + GETS | NA | SPRINT | NONE | NONE |
| 10XYZ + 0 + 710 + NCS + GETS | NA | BLOCK | NONE | NONE |
| 10222 + 1 + 710 + NCS + GETS | NA | MCI | NONE | NONE |
| 10288 + 1 + 710 + NCS + GETS | NA | AT&T | NONE | NONE |
| 10333 + 1 + 710 + NCS + GETS | NA | SPRINT | NONE | NONE |
| 10XYZ + 1 + 710 + NCS + GETS | NA | BLOCK | NONE | NONE |

Legend:
Other: CIC not equal to 288, 222 or 333 (CIC's of AT&T, MCI, or Sprint);
Block: Terminate call;
NA: Not Applicable/Irrelevant; and
Office Default: Assigned by manager and stored in SCP 1008.

TABLE 5

| Category | Result | Peg Count Value |
|---|---|---|
| 1 | Returned Selection Sequence is 1 | 01 |
| 2 | Returned Selection Sequence is 2 | 02 |
| 3 | Returned Selection Sequence is 3 | 03 |
| 4 | Returned Selection Sequence is 4 | 04 |
| 5 | Returned Selection Sequence is 5 | 05 |
| 6 | Returned Selection Sequence is 6 | 06 |
| 7 | Caller dialed invalid 10XYZ | 07 |
| 8 | Caller dialed 0+ | 08 |
| 9 | Caller dialed 10288 + 0/1 (AT&T) | 09 |
| 10 | Caller dialed 10333 + 0/1 (Sprint) | 10 |
| 11 | Caller dialed 10222 + 0/1 (MCI) | 11 |

The foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Changes may be made without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

For example, although the use of three carriers (primary, alternate, and secondary) is described specifically herein, the present invention is not so limited to three carriers; and any number of multiple carriers may be used. In addition, although the preferred carriers are MCI, AT&T or Sprint, other carriers may be selected. Adjustments in the size of the table and/or the codes to utilize different carriers are well within the scope of one of ordinary skill in this art.

Similarly, the use of "288", "222", and "333" as the CIC's of the preferred carriers, as well as other codes "10", "0" or "1", represent current industry norms. However, these values may be changed based on changes in industry norms and/or the selection of different carriers.

Further, the present invention contemplates the use of the telephone number 710-NCS-GETS to reach the Government Emergency Telecommunications Service. However, the invention is not so limited to this dedicated number and/or destination. Rather, the present invention can be used to route any predetermined number to any desired location through the routing features discussed herein.

In yet another example, the present invention considers all default carriers as authorized carrier, and vice versa. However, the invention is not so limited, as other carriers besides those in the default list for each location may be authorized carriers.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for improving the probability that a call based on an input number will be routed through a node to one of a plurality of interexchange carriers, the node having a predetermined sequence of preferred carriers assigned thereto, comprising:
   recognizing the input number;
   assigning primary, alternate and secondary interexchange carriers responsive to said recognizing; and sequentially routing the input number from the node among primary, alternate, and secondary carriers until a connection is established.

2. The method of claim 1, further comprising:
assigning classification data based on at least one of a code input with the input number and the assigned primary, alternate, and secondary carriers; and
using the classification data for at least one of statistical analysis and billing.

3. The system of claim 1, wherein the node is an end office of a network, the system further comprising entering the input number at a device connected to the end office.

4. A system for directing a communication from at least one location of a plurality of locations, through at least one carrier of a plurality of carriers, each of the plurality of locations including a ranking of interexchange carriers assigned thereto, the system comprising:
a setting processor configured to set, as a primary carrier for the at least one location, in order of preference, one of: a manually-selected carrier, an interexchange carrier, and a first ranked interexchange carrier; and
a router configured to sequentially route the communication to interexchange carriers corresponding to the primary carrier and an alternate carrier, until a connection is established.

5. The system of claim 4, further comprising a processor configured to terminate a communication if a code for an unauthorized interexchange carrier is requested during the communication.

6. The system of claim 4, wherein each ranking of carriers for each of the plurality of locations includes, in order of preference, the first ranked carrier, and second and third carriers.

7. The system of claim 4, wherein each ranking of carriers for each of the plurality of locations includes three interexchange carriers.

8. The system of claim 4, further comprising a memory configured to store data associated with the communication, including at least one of a communication time, a communication date, an originating number, an originating city, an originating state, an originating geographic location, a communication duration, a communication disposition, an interexchange carrier, an interexchange carrier selection sequence, a trunk group used, dialed digits, and a destination number.

* * * * *